United States Patent
Ballendat

(10) Patent No.: US 6,843,529 B2
(45) Date of Patent: Jan. 18, 2005

(54) STACKABLE CHAIR

(75) Inventor: Martin Ballendat, Altheim (AT)

(73) Assignee: Dauphin Entwicklungs- u. Beteiligungs-GmbH, Hersbruck (DE)

( * ) Notice: Subject to any disclaimer, the term of this patent is extended or adjusted under 35 U.S.C. 154(b) by 0 days.

(21) Appl. No.: 10/682,433

(22) Filed: Oct. 10, 2003

(65) Prior Publication Data

US 2004/0075316 A1 Apr. 22, 2004

(30) Foreign Application Priority Data

Oct. 10, 2002 (DE) ......................................... 102 47 346

(51) Int. Cl.[7] ................................................. A47C 3/04
(52) U.S. Cl. ....................................... 297/239; 403/382
(58) Field of Search ......................... 297/440.1, 445.1, 297/239; 403/331, 381, 363, 382, 267, 268

(56) References Cited

U.S. PATENT DOCUMENTS

| | | | | |
|---|---|---|---|---|
| 172,724 A | * | 1/1876 | Eno | ............................ 403/381 |
| 1,167,155 A | * | 1/1916 | Derby | .......................... 403/331 |
| 2,369,930 A | * | 2/1945 | Wagner, Sr. | ................. 248/188 |
| 2,649,136 A | | 8/1953 | Eames | |
| 2,730,419 A | | 1/1956 | Watruous et al. | |
| 3,115,367 A | * | 12/1963 | Gariepy | .................... 297/440.1 |
| 3,589,758 A | * | 6/1971 | King | .......................... 52/584.1 |
| 4,436,342 A | * | 3/1984 | Nilson et al. | ............. 297/446.1 |
| 4,648,653 A | * | 3/1987 | Rowland | ..................... 297/239 |
| 5,678,892 A | * | 10/1997 | Heitlinger | .............. 297/344.18 |

FOREIGN PATENT DOCUMENTS

| | | |
|---|---|---|
| CH | 517 469 | 2/1972 |
| CH | 657 258 A | 8/1986 |
| DE | 41 36 611 | 5/1992 |
| EP | 0 473 028 A | 3/1992 |
| GB | 2229487 * | 9/1990 |

* cited by examiner

Primary Examiner—Milton Nelson, Jr.
(74) Attorney, Agent, or Firm—Browdy and Neimark, P.L.L.C.

(57) ABSTRACT

A stackable chair includes a seating member comprising a seat, and a plurality of chair legs. Each of the chair legs is attached to the seating member with its own connecting device. The connecting device (11) includes a connecting plate which is inserted in a recess of the seating member such that it does not extend beyond the seating member where the chair is adjacent to other chairs in the stacked condition. The chair leg is attached to the connecting plate. The result is a chair which can be stacked in a compact manner.

14 Claims, 5 Drawing Sheets

STACKABLE CHAIR

BACKGROUND OF THE INVENTION

1. Field of the Invention

The present invention relates to a stackable chair comprising a seating member and a plurality of chair legs attached thereto.

2. Background Art

Such stackable chairs are known as they are obviously in use at present. In these known chairs, the chair legs are attached to the seating member by means of at least one frame member which is arranged below the seat and which connects the chair legs with one another. If such frame members are used as assembly fittings, there remains a considerable space between the chairs when they are stacked so that the chairs require a relatively large space even in a stacked condition.

SUMMARY OF THE INVENTION

Therefore the object of the invention was to further develop a chair of the type described above so that it can be stacked in a more compact manner.

According to the invention, this object has been achieved by means of a chair comprising: a seating member including a seat, a plurality of chair legs, wherein each chair leg is connected to the seating member by means of its own connecting device including a connecting plate, which is inserted into a recess of the seating member such that it does not extend beyond the seating member where the chair is adjacent to other chairs in the stacked condition, and to which the chair leg is attached.

According to the invention, it has been found that assembly fittings arranged below the seat can be dispensed with if the connecting plate for attaching the chair legs to the seating member can be inserted in a recess provided in the seating member. The individual seating bodies of chairs designed in this way can be placed on top of each other directly or with only a small space between them when the chairs are stacked so that the chairs can always be stacked in a compact manner. If the chair includes a fabric covering, a trough-like member arranged on the lower side of the seat is not needed for stacking.

If the connecting plates are inserted in the seating member in the area of the flat tabular members, the required thickness of the seating member material can be minimized while still meeting given requirements with respect to the carrying capacity thereof.

The forming of the recess and the connecting plate, which are part of a connecting device, such that they interact in the manner of a dovetail guide and the forming of the connecting plate such that it is insertable in the seating member, wherein the connecting plate tapers conically, ensure that the connecting plate is securely held in the recess.

Gluing the connecting plate to the seating member can be established without special tools.

A surface treatment of the gluing surfaces on the connecting plate on the one hand and of the seating member on the other, which are in contact with one another, enhances the adhesive effect which can be obtained using a certain glue.

Stacking protection members, which are attached to the connecting plates such that in the stacked condition the chair abuts adjacent chairs at least partly via the stacking protection members, protect e.g. the seating bodies or the chair legs of stacked chairs according to the invention.

A threaded member, which is inserted in the chair leg at least partly and whose thread is engaged by a screw which retains the connecting plate next to the threaded member, ensures that the chair legs will be securely attached to the connecting plates.

A welded joint attaching the threaded member to the chair leg can be established in a safe and economical manner.

In order to meet the requirement that the chairs can be stacked in a compact manner, an important characteristic as regards the connecting plate according to the invention is that it must not extend beyond the seating member in an upward or downward direction. The connecting plate may, however, extend beyond the seating member in a sideways direction. In this case, the connecting plate according to claim 10 is particularly suitable for attaching an armrest as well. The assembly fittings which are necessary for assembling a chair having armrests are thus reduced.

An example embodiment of the invention showing these and other advantages will hereinafter be explained in more detail with reference to the drawing.

DESCRIPTION OF THE PREFERRED EMBODIMENT

Figure 1:
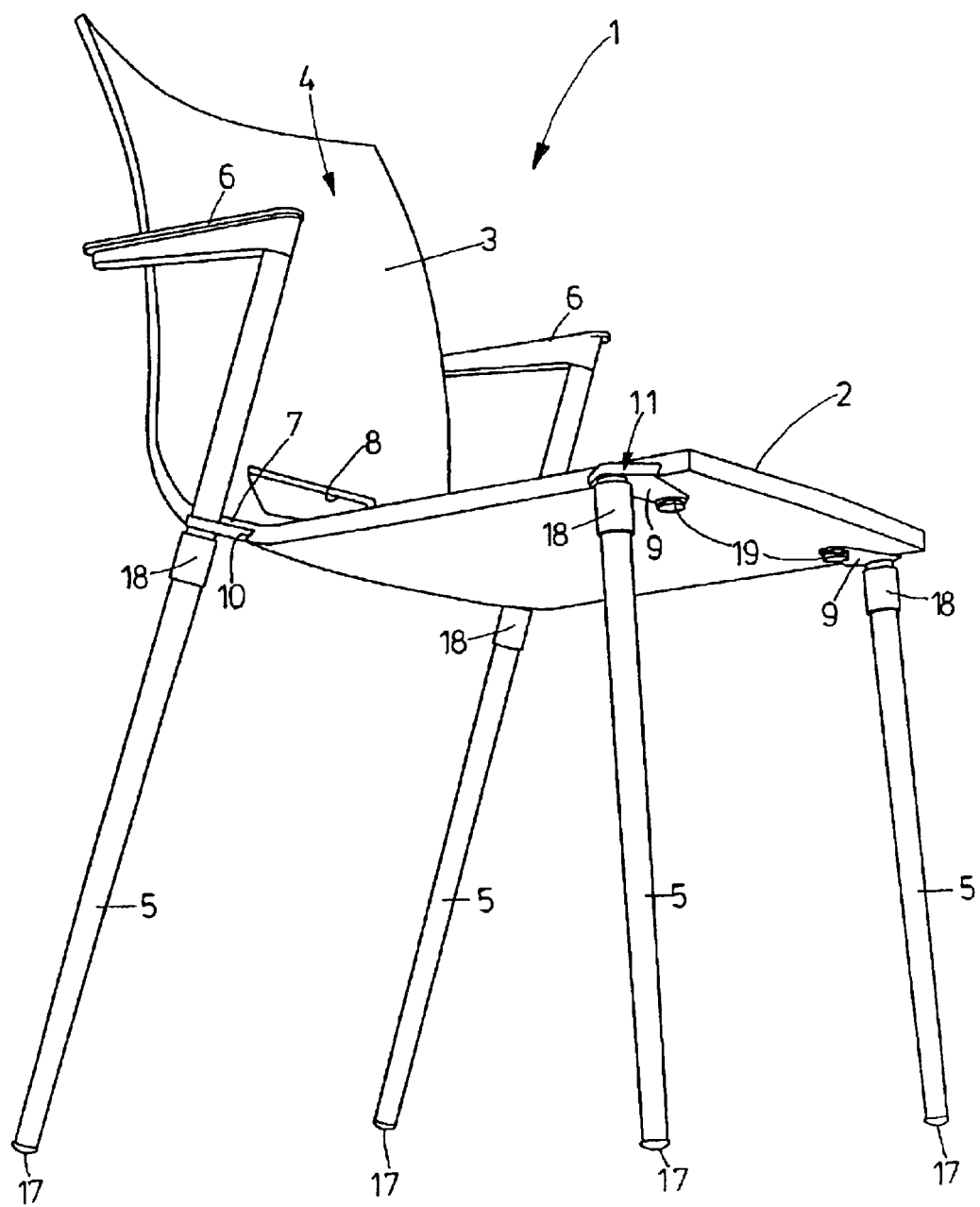
FIG. 1 shows a perspective view of a stackable chair.

A stackable chair, which as a whole is referred to by reference numeral 1 in the drawing, comprises a seating member 4 including a seat 2 and a backrest 3, four chair legs 5 and two armrests 6.

The seating member 4 has the form of a seat shell and is made of a tabular plywood or plastic material. The tabular material of the seating member 4 is approximately 15 mm thick. The seat 2 is substantially planar, i.e. is a planar face member of the seating member 4, and seamlessly changes into the backrest 3 via a curved section 7. The curved section 7 does not have a uniform bending radius, but includes a planar portion which also is a planar face member of the seating member 4 in the area where the seat and the backrest meet. In addition, the seating member 4 is provided with a rectangular opening 8 in the area of the curved section 7.

Figure 2:
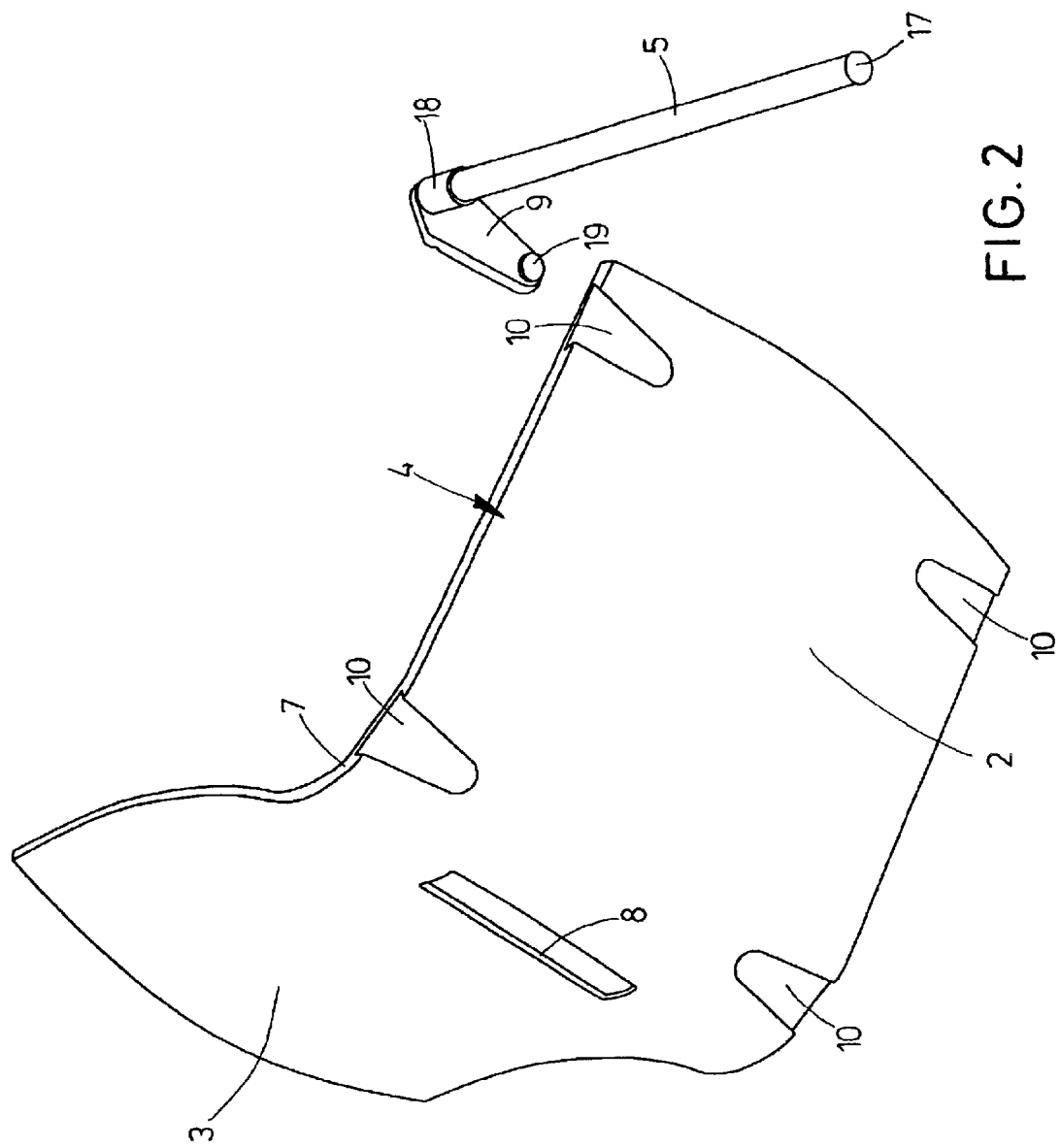
FIG. 2 shows a perspective view of a seating member and of a chair leg of the chair depicted in FIG. 1 in a disassembled condition.

The chair legs 5 are attached to the seating member 4 by means of connecting plates 9. For this purpose, the seating member 4 is provided with a recess 10 for each chair leg 5, which recess is formed complementary to the respective connecting plate 9 and in which the connecting plate 9 is inserted from the side. This can be seen especially well in FIG. 2, which shows the seating member 4 and a chair leg 5 with the corresponding connecting plate 9 in a disassembled condition. A pair of recesses 10 is provided at the end of the part of the seat 2 facing away from the backrest 3. Another pair of recesses 10 is provided in the flat portion of the curved section 7. The connecting plate 9 fits in the recess 10 such that it does not extend beyond the seating member 4 where the chair 1 is adjacent to other chairs in the stacked condition. In the area of the recesses 10, the tabular material of the seating member 4 has a residual thickness of approximately 8 mm.

Figure 3:
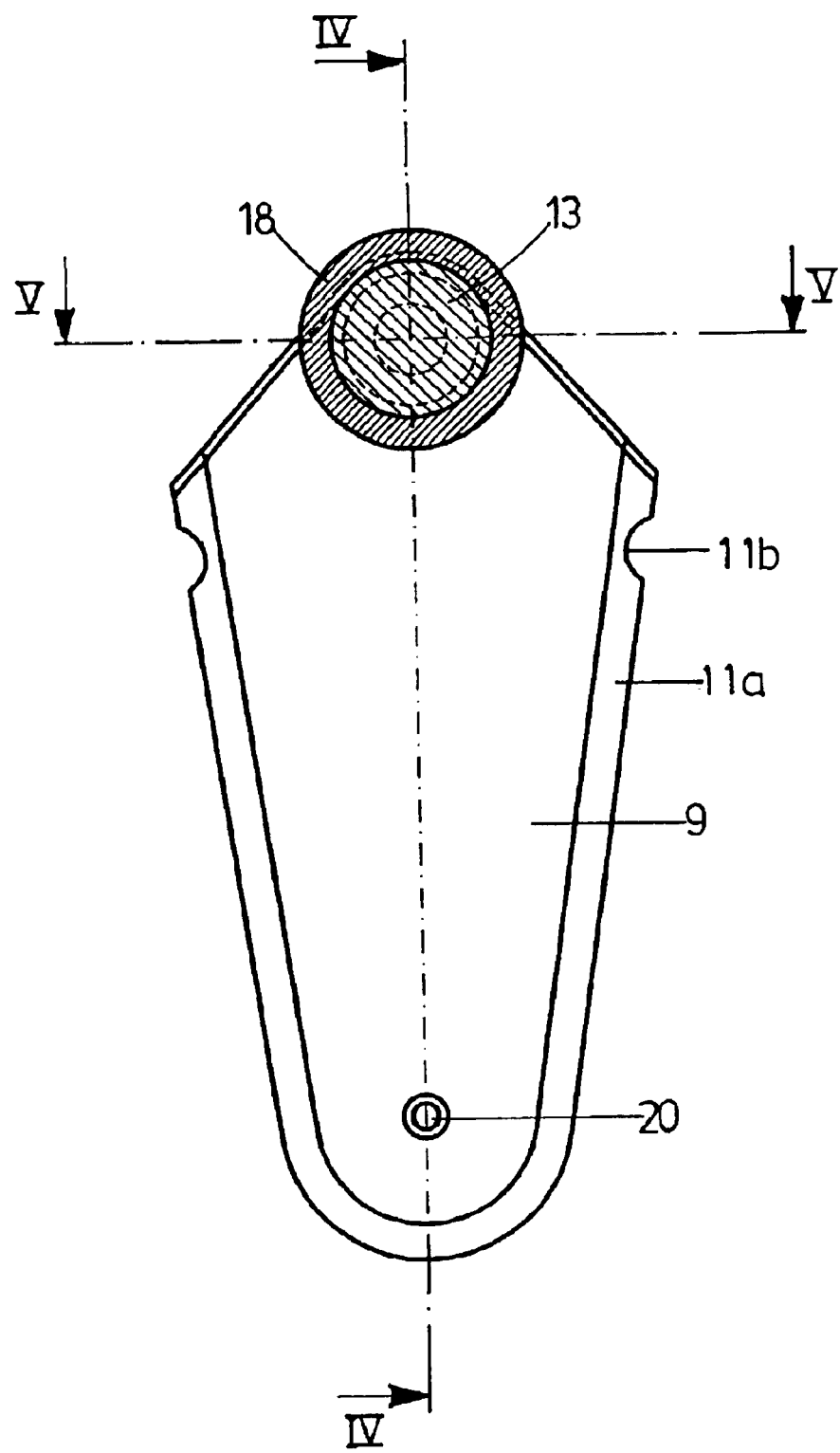
FIG. 3 shows a view of a connecting plate by means of which a chair leg is connected to the seating member as seen from above, wherein the chair leg is shown in cross section in the area of a stacking protection sleeve.
Figure 4:
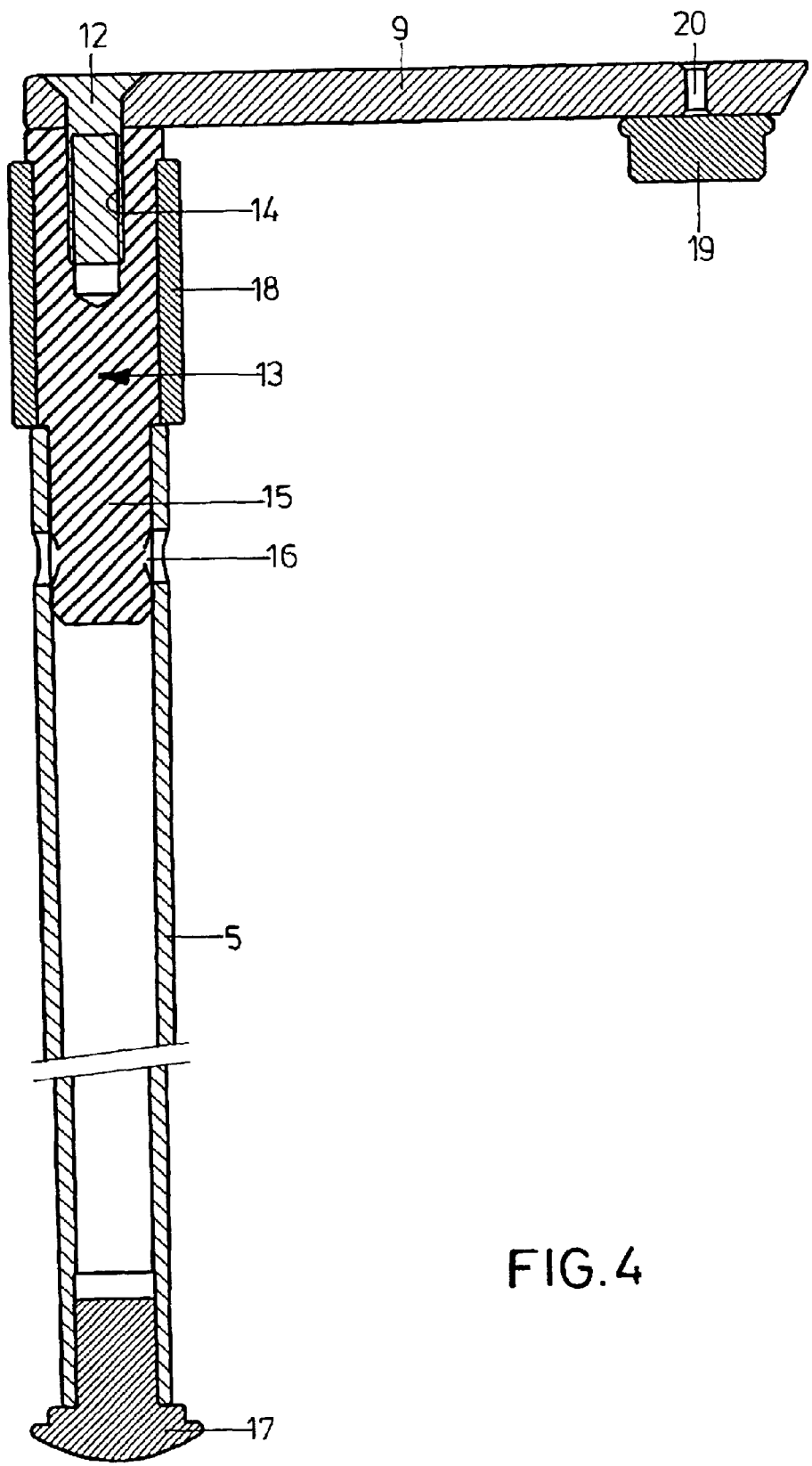
FIG. 4 shows a section along the line IV—IV in FIG. 3, wherein the chair leg is depicted in a broken manner.
Figure 5:
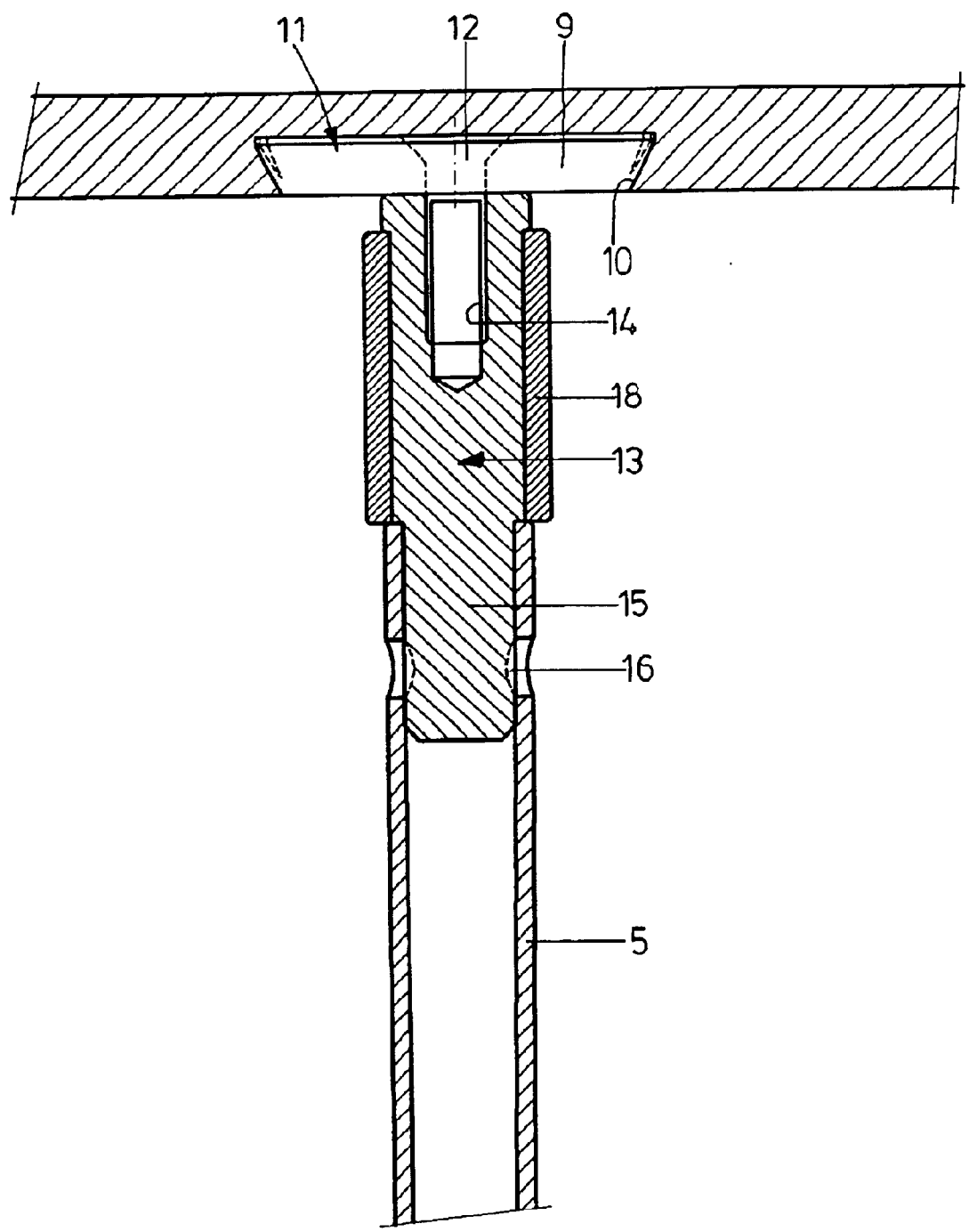
FIG. 5 shows a section along the line V—V in FIG. 3, wherein only part of the chair leg is depicted while part of the seating member is depicted as well.

FIGS. 3 to 5 show details of a connecting device 11 including the connecting plate 9, which connecting device connects one chair leg 5 to the seating member 4. The connecting plate 9 and the recess 10 have side walls 11a tapering in the manner of a dovetail guide, as can be seen especially well in FIG. 5. Jointly with the conical tapering of the connecting plate 9 towards the end thereof which is inserted first and the complementary form of the recess 10, these side walls ensure that the connecting plate 9 is securely held in the recess 10. In addition, the connecting plate 9 is glued in the corresponding recess 10 when the chair legs 5 have been assembled. The gluing surfaces by means of which the connecting plates 9 are glued in the recesses 10 have been surface-treated in an appropriate manner, in particular roughened. Two collecting recesses 11b having the shape of a partial circle are formed in the edge area of the side walls 11a, in which collecting recesses excess glue can be received when the connecting plates 9 are glued in the recesses 10 so that no glue flows out possibly dirtying the chair.

Besides the connecting plate 9 and the recess 10, the connecting device 11 includes a screw 12 and a threaded member 13 connected to the chair leg. 5. The screw 12 has the form of a countersunk-head screw the upper head surface of which is flush with the upper wall of the connecting plate 9 in the assembled condition. The screw 12 is screwed into a complementary internal thread 14 of the threaded member 13. The latter has the form of a welding bolt, i.e. it is inserted in the hollow chair leg 5 in a lower section 15 thereof and welded thereto by means of a welded joint 16.

The free ends of the chair legs 5 are closed by means of plug-like sliding members 17. In use, the chair 1 stands on the sliding members 17 and can easily be moved.

The threaded member 13 is enclosed by a stacking protection sleeve 18 made of a soft plastic material between the chair leg 5 and the connecting plate 9. In addition, a stacking protection buffer 19 is attached to the lower side of the connecting plate 9, at the end thereof which faces away from the chair leg 5, by means of a push-fit connection 20. The stacking protection sleeve 18 and the stacking protection buffer 19 are stacking protection members via which the chair 1 abuts adjacent chairs 1 in the stacked condition. In this way, the seating member 4 on the one hand and the chair legs 5 on the other are protected when the chair 1 is stored in a stack.

At the side opposite the chair legs 5, an armrest 6 is attached to each of the connecting plates 9 which are inserted in the two recesses 10 in the curved section 7.

A plurality of chairs 1 can be transported by transporting the disassembled seating bodies 4 in a stack while the chair legs 5 with the connecting devices 11 are transported separately. When the chairs 1 are assembled, the connecting plates 9 are attached to the chair legs 5 first and then inserted in the recesses 10 and glued.

What is claimed is:

1. A stackable chair (1)
   comprising a seating member (4) including a seat (2),
   comprising a plurality of chair legs (5),
   wherein each chair leg (5) is connected to the seating member (4) by
   a connecting device (11) which is a part of said chair leg (5), said connecting device (11) including a connecting plate (9),
      which connecting plate (9) is inserted into a recess (10) of the seating member (4) such that said connecting plate does not extend beyond the seating member (4) where the chair (1) is adjacent to other chairs in the stacked condition,
   to which the chair leg (5) is attached,
   wherein said recess (10) and said connecting plate (9), which are part of said connecting device (11), are formed such that they interact in the manner of a dovetail guide.

2. A chair according to claim 1, wherein the seating member (4) includes planar face members (2, 7), wherein the connecting plates (9) are inserted in the seating member (4) in the area of the planar face members (2, 7).

3. A chair according to claim 2, wherein the seating member (4) includes a backrest (3).

4. A chair according to claim 1, wherein the connecting plate (9) is formed such that it is insertable in the seating member (4), wherein the connecting plate (9) tapers conically.

5. A chair according to claim 4, wherein the connecting plate (9) tapers towards an end thereof which is inserted first.

6. A chair according to claim 1,
   wherein stacking protection members (18, 19) are attached to the connecting plates (9) and the chair legs (5) such that in the stacked condition, the chair (1) abuts adjacent chairs at least partly via the stacking protection members (18, 19).

7. A chair according to claim 1,
   wherein stacking protection members (18, 19) are attached to the connecting plates (9) such that in the stacked condition the chair (1) abuts adjacent chairs at least partly via the stacking protection members (18, 19).

8. A chair according to claim 1,
   wherein the chair legs (5) are hollow, wherein the connecting device (11) includes a threaded member (13) which is inserted in the chair leg (5) at least partly and whose thread (14) is engaged by a screw (12) which retains the connecting plate (9) next to the threaded member (13).

9. A chair according to claim 8, wherein the threaded member (13) is attached to the chair leg (5) by means of a welded joint (16).

10. A chair according to claim 1,
    wherein an armrest (6) is attached to the connecting plate (9).

11. A chair according to claim 1,
    wherein the connecting plate (9) is glued to the seating member (4).

12. A chair according to claim 11, wherein the gluing surfaces of the connecting plate (9) on the one hand and of the seating member (4) on the other, which are in contact with one another, are surface-treated gluing surfaces in order to enhance the adhesive effect.

13. A chair according to claim 11, wherein the connecting plate (9) is provided with at least one collecting recess (11b) which together with the opposite wall of the recess (10) forms a collecting space for excess glue.

14. A chair according to claim 1,
    wherein stacking protection members (18, 19) are attached to the chair legs (5) such that in the stacked condition, the chair (1) abuts adjacent chairs at least partly via the stacking protection members (18, 19).

* * * * *